Dec. 2, 1930.    J. PUGLIESE    1,783,341
SYSTEM OF FILTRATION
Filed Aug. 31, 1929    4 Sheets-Sheet 1
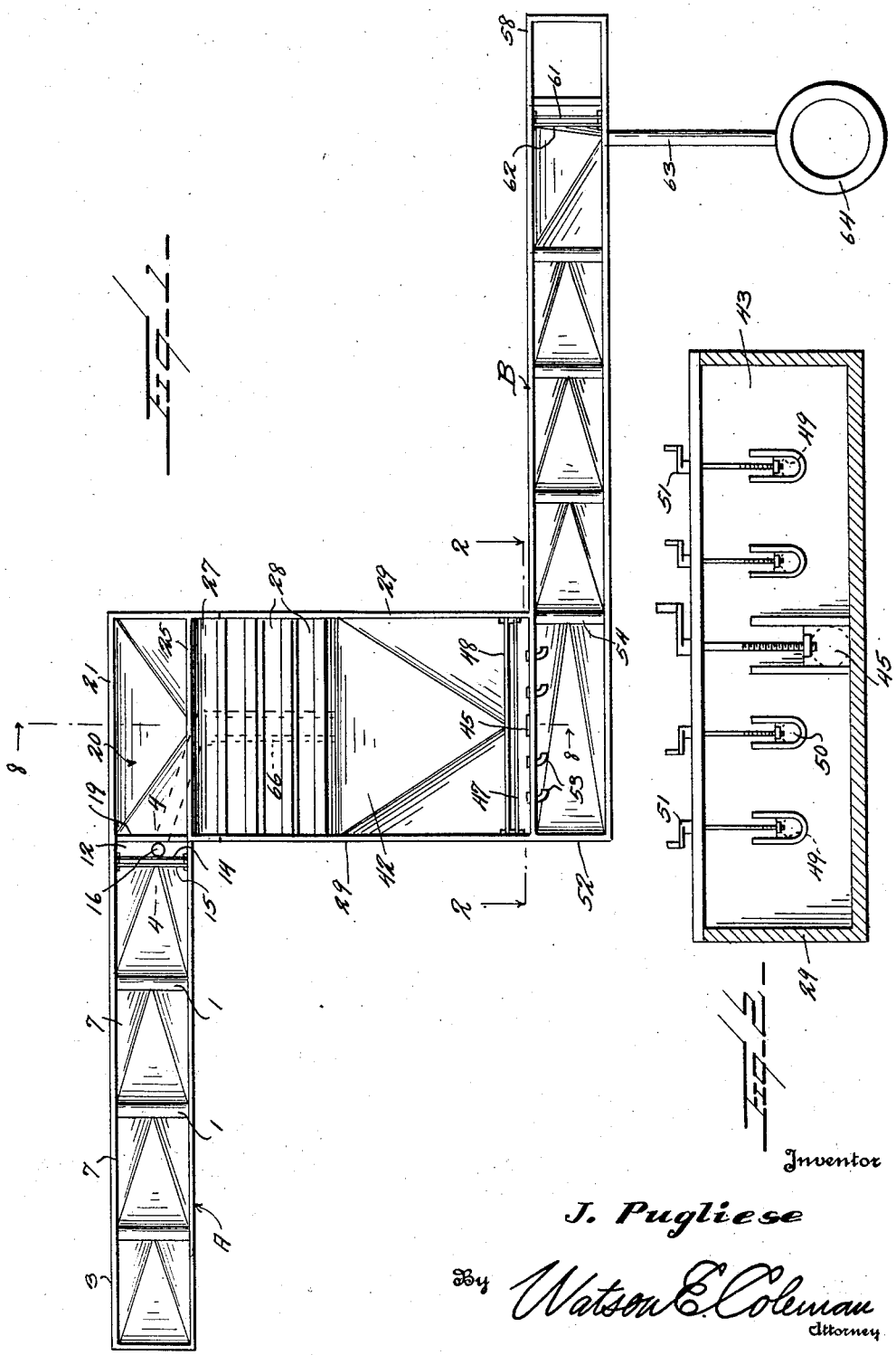
Inventor
J. Pugliese
By Watson E. Coleman
Attorney Dec. 2, 1930.  J. PUGLIESE  1,783,341
SYSTEM OF FILTRATION
Filed Aug. 31, 1929  4 Sheets-Sheet 2
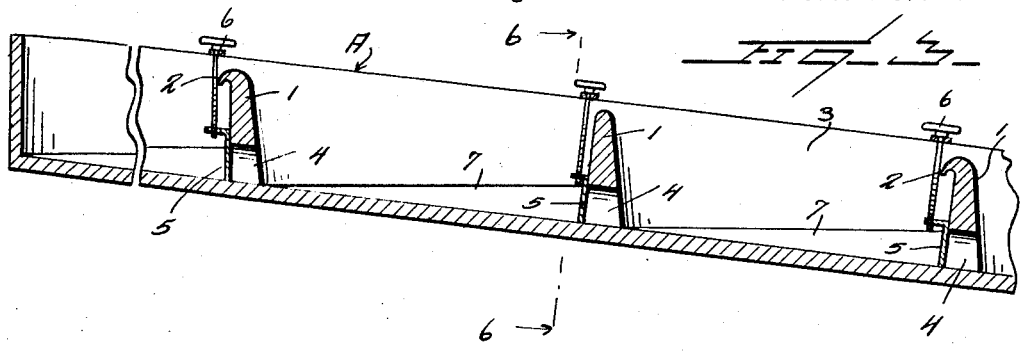
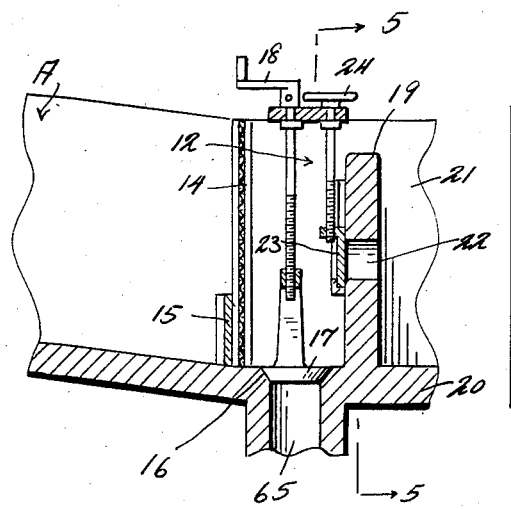
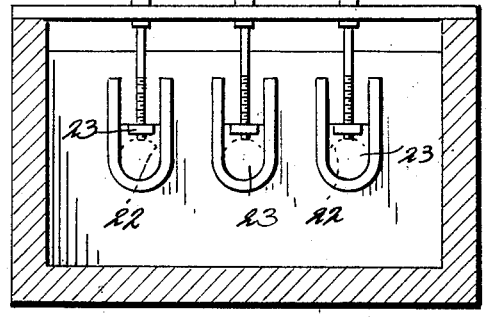
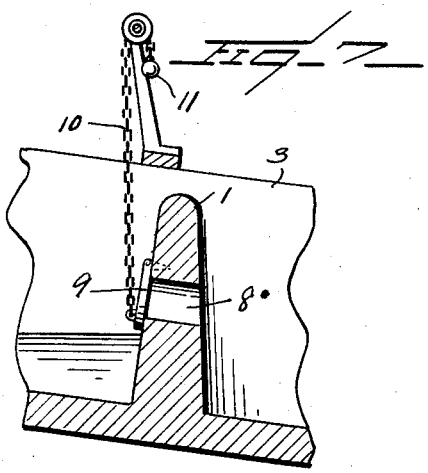
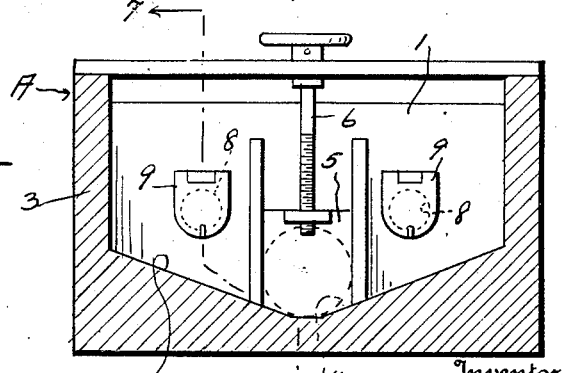
Inventor
J. Pugliese
By Watson E. Coleman
Attorney Dec. 2, 1930.    J. PUGLIESE    1,783,341
SYSTEM OF FILTRATION
Filed Aug. 31, 1929    4 Sheets-Sheet 3
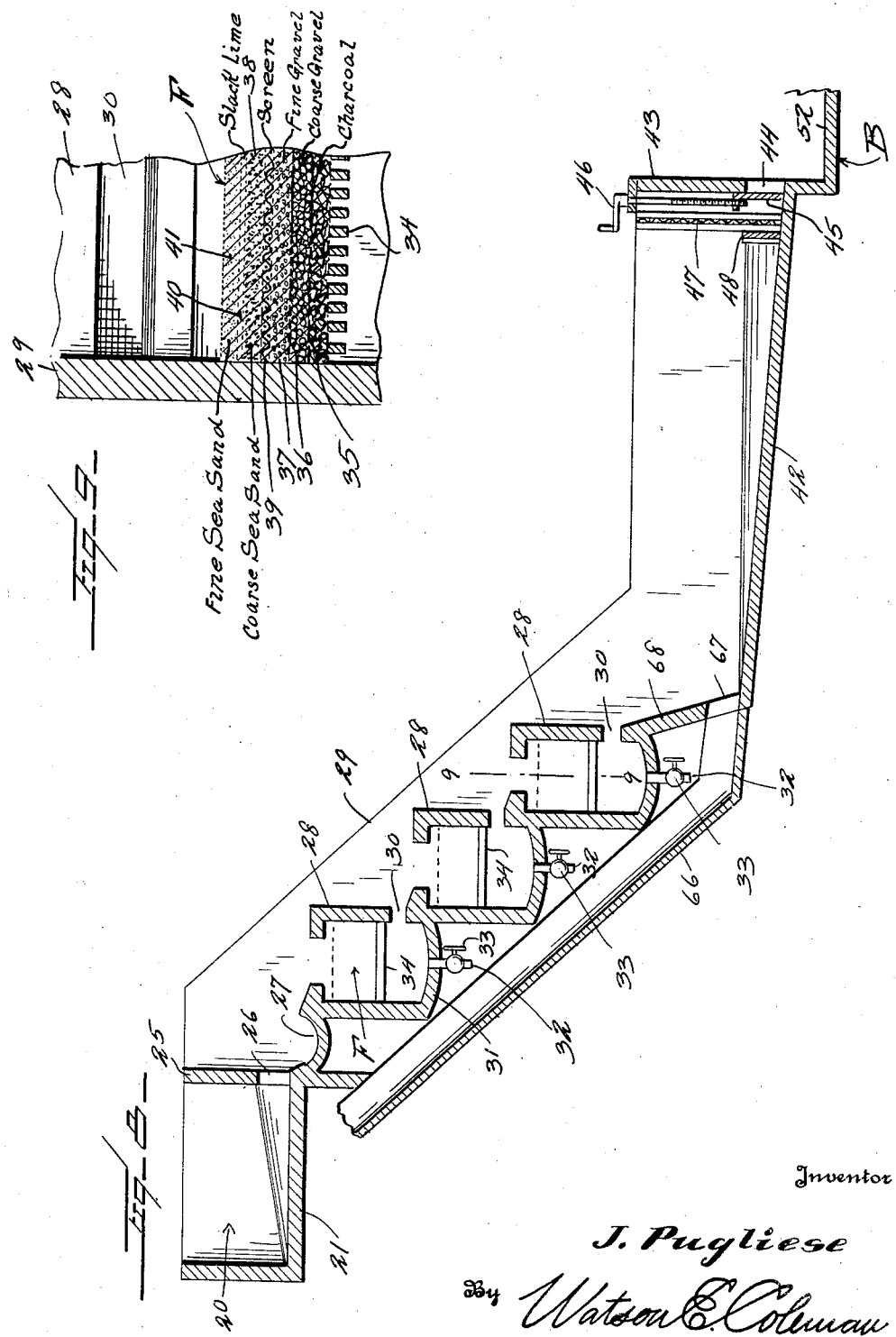

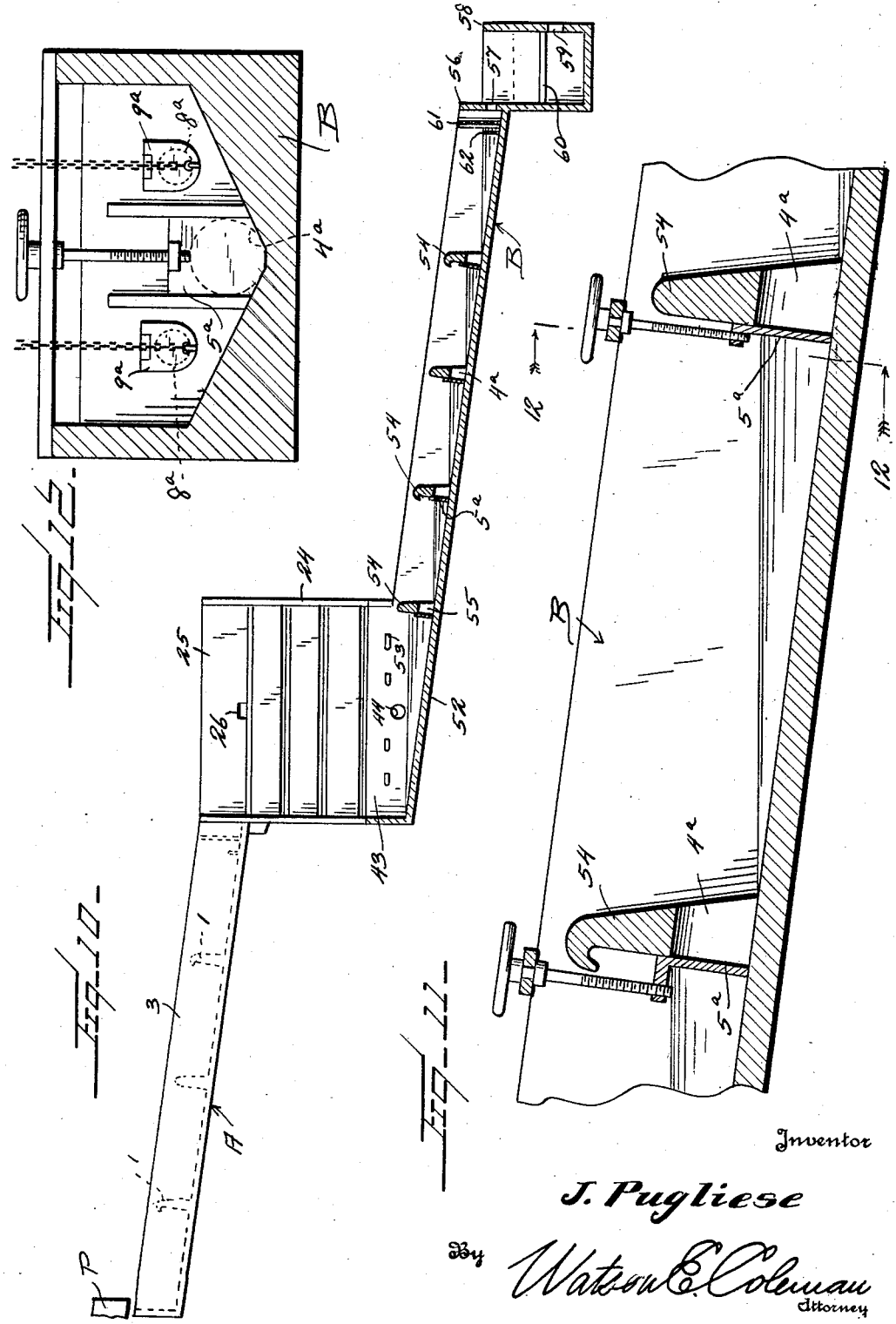

Patented Dec. 2, 1930

1,783,341

UNITED STATES PATENT OFFICE

JOHN PUGLIESE, OF SOUTH MANCHESTER, CONNECTICUT

SYSTEM OF FILTRATION

Application filed August 31, 1929. Serial No. 389,759.

This invention relates to a system of filtration and has relation more particularly to the purification of sewage, and it is an object of the invention to provide means whereby the sewage or the like to be treated is subjected in proper sequence to a plurality of requisite steps or actions resulting in effective separation of impurities from the water.

The invention also has for an object to provide a system of this kind whereby the water as finally discharged is substantially free from all impurities.

The invention consists in the details of construction and in the combination and arrangement of the several parts of my improved system of filtration whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of the apparatus as employed in connection with my filtration system;

Figure 2 is an enlarged sectional view taken substantially on the line 2—2 of Figure 1;

Figure 3 is an enlarged fragmentary sectional view taken lengthwise through the uppermost trough or tank as herein disclosed;

Figure 4 is an enlarged fragmentary sectional view taken substantially on the line 4—4 of Figure 1;

Figure 5 is a transverse sectional view taken substantially on the line 5—5 of Figure 4;

Figure 6 is a transverse sectional view taken substantially on the line 6—6 of Figure 3;

Figure 7 is a fragmentary detail sectional view taken substantially on the line 7—7 of Figure 6;

Figure 8 is an enlarged fragmentary sectional view taken substantially on the line 8—8 of Figure 1;

Figure 9 is an enlarged fragmentary sectional view taken substantially on the line 9—9 of Figure 8;

Figure 10 is a view partly in side elevation and partly in longitudinal section of the structure as illustrated in Figure 1;

Figure 11 is an enlarged fragmentary sectional view taken lengthwise through the lowermost trough as illustrated in Figures 1 and 10;

Figure 12 is a transverse sectional view taken substantially on the line 12—12 of Figure 11.

As disclosed in the accompanying drawings, A denotes an elongated tank of desired dimensions and disposed lengthwise on a predetermined incline, the upper end portion of the tank A being the receiving end. The sewage or other material to be separated is delivered to the upper or receiving end portion of this tank A through the medium of a pipe P or otherwise as may be preferred.

The tank A at predetermined points spaced lengthwise thereof is provided with the transversely disposed partitions 1 and the upper portions of certain of said partitions are provided with rearwardly and downwardly curved flanges 2. These flanges 2 provide means to prevent material surging over associated partitions 1 and thus materially facilitate the desired deposit of relatively heavy sediment in the initial step of filtration or purification.

The partitions 1 have their upper edges a desired distance below the upper edges of the side walls 3 of the tank A and said partitions also divide the tank A into a plurality of successive chambers or compartments. Each of the partitions 1 at substantially its longitudinal center is provided in its lower portion with a relatively large cleanout opening 4 normally closed by a valve 5. The valve 5 may be as preferred but is adapted to be moved into open or closed position in any manner deemed preferable. In the accompanying drawings a conventional means is indicated at 6 for the manipulation of such valve.

The lower portions of the side walls 3 of the tank A in each of the compartments are inwardly and downwardly inclined, as at 7, the inner margins of said inclined portions converging from the upper end of the compartment toward the low point of the opening 4 of the adjacent partition 1. This provision is made to assure the proper flow of the sediment collected within each of the chambers or compartments of the tank A during a cleanout operation.

Each of the partitions 1 at opposite sides of the opening 4 and at a desired distance above the bottom of the tank A is provided with the openings 8. Flow through each of these openings 8 is normally closed by a valve 9, herein disclosed as of a flap type, which is adapted to be moved upwardly into open position when desired upon requisite pull being imposed upon the associated chain 10 or other flexible member. To facilitate the desired operating of the valve 9, the chain or flexible member 10 carries a weighted member 11 which serves to equalize the weight of the valve 9 proper.

The inner end of the tank A for a short distance is continued by a horizontal portion 12 which is normally separated from the inner or adjacent compartment of the tank A by a screened wall 14 which is adapted to be slidably placed in desired position and relatively removed when desired. Immediately adjacent to this screen 14 and disposed over the lower portion thereof is a relatively low partition 15. This partition 15 is also adapted to be slid into or out of position as desired.

The bottom of the portion 12 of the tank A at substantially its center is provided with a relatively large discharge opening 16 normally closed by a valve 17. This valve 17 has associated therewith suitable means 18 whereby the valve may be raised or lowered into open or closed position as desired.

The lower horizontal portion 12 of the tank A is separated by a transversely disposed partition 19 from a top well 20 of requisite dimensions, said partition 19 terminating a desired distance below the upper edges of the side walls 21 of the well 20. The partition 19 at a desired distance above the bottom of the well 20 is provided with a plurality of openings 22, shown in Figure 5 as three in number, and each of such openings 22 is normally closed by a valve 23. The valve 23 in the present embodiment of my invention is of a sliding type but is adapted to be moved into open or closed position in any desired manner, as indicated at 24.

The forward side wall 25 of the well 20 is provided in its lower portion with a discharge opening 26 and the bottom wall of the well 20 is inclined from each end thereof and from the rear toward the low point of such opening 26 to assure an effective flow therethrough. The opening 26 discharges within a gutter 27 extending substantially end to end along the lower front face of the well 20. This gutter 27 discharges within the uppermost of a plurality of vertically arranged and downwardly and forwardly stepped troughs 28. The ends of the gutter 27 and the troughs 28 are closed by the side walls 29, said walls extending above said gutter 27 and troughs 28 a desired distance as particularly illustrated in Figure 8 of the accompanying drawings. Each of the troughs 28 at a desired distance above its bottom is provided in its forward wall with the discharge opening 30 and each of the upper troughs 28 discharges within the trough immediately therebelow and adjacent thereto.

The bottom 31 of each of the troughs 28 has in communication therewith the carry-off or draining pipe 32, the flow through which being normally closed by a conventional valve 33. Each of the troughs 28 above the discharge pipe 33 and in relatively close proximity therewith is provided with the fixed grate bars 34 to form a support for a suitable filtering medium F. The filtering medium F in each of the troughs 28 substantially fill said trough between the bars 34 therein and the top thereof.

As illustrated in detail in Figure 9, the filtering medium F, as herein disclosed, comprises a bottom layer 35 of charcoal and upon which is superimposed a layer 36 of coarse gravel. Over this layer 36 is arranged a layer 37 of fine gravel upon which is placed a layer 38 of coarse sea sand. Interposed between the layers 37 and 38 is a screen fabric 39. Disposed over the layer 38 of coarse sea sand is a relatively shallow layer 40 of slack lime and arranged over this layer 40 is a layer 41 of fine sea sand.

The lower and forward trough 28 discharges within a bottom well 42 of desired dimensions and the forward or front wall 43 of this well 42 at substantially its center and in its bottom portion is provided with a discharge opening 44. This opening 44 is normally closed by a valve 45 preferably of a sliding type and which is adapted to be raised or lowered into open or closed position by any desired means as indicated at 46. Immediately in advance of this wall 43 the well 42 has disposed transversely thereof the screen 47 of a type to be readily slid into or out of desired position.

Immediately adjacent to the lower portion of this screen 47 and slidably disposed within the well 42 is a relatively low partition 48.

The bottom of the well 42 from the sides thereof and the rear, as is particularly indicated in Figure 1, are inclined toward the low point of the opening 44 to assure effective discharge therethrough.

The side wall 43 at a desired distance below the bottom of the well 42 is provided with a series of openings 49, herein disclosed as four in number. Each of said openings in the present embodiment of my invention is normally closed by a slide valve 50 adapted to be raised or lowered into open or closed position by any desired means, as indicated at 51.

The opening 44 discharges into a bottom trough 52 and the openings 49 have extending therefrom the discharge nozzles 53 disposed in a direction toward the partition 54 separating an end of the bottom trough 52 from the bottom tank B. These nozzles 53 are of advantage as they prevent undue agitation of any sediment which may be collected within the bottom of the trough 52. The bottom of the trough 52 is inclined from the sides and from the rear end toward the central opening 55 in a partition 54 hereinbefore referred to. This is also true of the bottom of the well 42.

The tank B has disposed thereacross a plurality of partitions 54 in longitudinal spaced relation, said partitions being constructed in substantially the same manner as the partitions 1 arranged within the tank A. That is to say, each of the partitions 54 is provided in its bottom portion with a centrally located and relatively large opening 4a normally closed by a slide valve 5a and also with the smaller openings 8a arranged at opposite sides of the opening 4a and a desired distance above the bottom of the tank B. These openings 8a are also normally closed by the valves 9a herein disclosed as of a flap type.

The lowermost end wall 56 of the tank B is provided with a central opening 57 which discharges within a trough 58. This trough 58 at a desired distance above its bottom wall is provided with a discharge opening 59. Intersecting the trough 58 above the discharge opening 59 and in relatively close proximity thereto is provided a grate 60 for supporting a filtering medium such as hereinbefore referred to and as particularly illustrated in Figure 9 of the accompanying drawings.

The lower end of the tank B also has disposed thereacross a removable screen 61 and immediately adjacent thereto and in advance thereof with the relatively low partition 62. In communication with the lower portion of the tank B and preferably through a side wall thereof is a pipe line 63 leading to a storage tank or cistern 64 to receive the waste matter separated during the purification of the water.

The discharge opening 16 hereinbefore referred to is continued by a carry-off pipe 65 which delivers within the upper portion of a trough 66 underlying the troughs 28 and discharging within the bottom well 42 through a centrally located opening 67 provided in the lower portion of the rear wall 68 of the well 42.

In practice, the water to be purified is delivered within the upper portion of the tank A and with the valves 5, 16 and 23 closed. The water rises within the tank A until the various compartments therein are filled and during which time the heavy matter within the water will settle to the bottom of such compartments. The screen 14 serves to prevent any floating matter to pass over into the upper well 20 while the low partition 15 provides means to assure a proper collection of sediment deposited within the lower compartment of the tank A. The water as received in the upper well 20 is free to a considerable extent from impurities and as the water passes out through the opening 26 it will be received by the trough 27 and from there discharged within the uppermost of the troughs 28. The liquid as it passes downwardly in succession through the filtering mediums within the stepped troughs 28 will be further freed of foreign matter therein and particularly fine and light sediment so that when the water is received in the bottom well 42 it is substantially free from impurities.

To assure further effective filtering the water within the bottom well 42 is then discharged into the trough 52 and from there to the bottom tank B where the water is subjected to substantially the same treatment as initially in the upper tank A. From the tank B the water is discharged within the trough 58 and subjected to a final action by the filtering medium therein. It has been found in practice that the water discharged from the trough 58 is substantially free of all impurities.

When it is desired to clean out the various tanks and troughs, the valves 9, 23, 50 and 9a are opened whereby the water retained above the collected sediment will readily drain out.

To facilitate this action the filtering mediums within the troughs 28 may be first removed which can be readily done through the carry-off pipes 32. After this water has been taken off in the cleaning operation, the collected sediment within the various compartments may be removed in any desired manner and after the valves 5 and 16 have been opened water under pressure may be discharged within the upper portion of the top tank A which will effectively clean out the compartments and flush the same out through the pipe 65 and trough 66. This action will also effectively flush out the bottom well 42 and can be continued to flush out the bottom tank B. During this action or operation the screen 14 and partition 15 are adapted to be removed as well as the kindred screens and partitions used at other points.

It is to be understood in practice that the various parts of the apparatus as herein described and illustrated are relatively large in size so that workmen may have ready access to the various parts thereof although it is to be understood that I do not desire to limit myself to any particular dimensions.

From the foregoing description it is thought to be obvious that a system of filtration constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A filtering apparatus comprising an upper tank, partitions dividing the tank into a plurality of chambers, each chamber discharging into the next chamber over an interposed partition, each of said partitions having an opening adjacent to the bottom of the tank, a valve closing each of said openings, said partitions having additional openings spaced above the bottom of the tank, valves for closing said second named openings, a trough into which the tank discharges, and a filtering medium within the trough.

2. A filtering apparatus comprising an upper tank, partitions dividing the tank into a plurality of chambers, each chamber discharging into the next chamber over an interposed partition, each of said partitions having an opening adjacent to the bottom of the tank, a valve closing each of said openings, said partitions having additional openings spaced above the bottom of the tank, valves for closing said second named openings, a trough into which the tank discharges, a filtering medium within the trough, and a gutter interposed between the trough and the tank, said tank discharging directly into the gutter and the gutter discharging into the trough.

3. A filtering apparatus comprising an upper tank, partitions dividing the tank into a plurality of chambers, each chamber discharging into the next chamber over an interposed partition, each of said partitions having an opening adjacent to the bottom of the tank, a valve closing each of said openings, said partitions having additional openings spaced above the bottom of the tank, valves for closing said second named openings, a plurality of vertically arranged troughs discharging successively one into the other, the tank discharging into one of said troughs, and a filtering medium within each of the troughs.

4. A filtering apparatus comprising an upper tank, partitions dividing the tank into a plurality of chambers, each chamber discharging into the next chamber over an interposed partition, each of said partitions having an opening adjacent to the bottom of the tank, a valve closing each of said openings, said partitions having additional openings spaced above the bottom of the tank, valves for closing said second named openings, a trough into which the tank discharges, a filtering medium within the trough, a carry-off pipe in communication with the discharge end portion of the tank, and a valve for closing said carry-off pipe.

5. A filtering apparatus comprising an upper tank, partitions dividing the tank into a plurality of chambers, each chamber discharging into the next chamber over an interposed partition, each of said partitions having an opening adjacent to the bottom of the tank, a valve closing each of said openings, said partitions having additional openings spaced above the bottom of the tank, valves for closing said second named openings, a trough into which the tank discharges, a filtering medium within the trough, a carry-off pipe in communication with the discharge end portion of the tank, a valve for closing said carry-off pipe, a trough into which said carry-off pipe discharges, and a valve controlled drain for the first named trough discharging into the last named trough.

In testimony whereof I hereunto affix my signature.

JOHN PUGLIESE.